Figure 1:
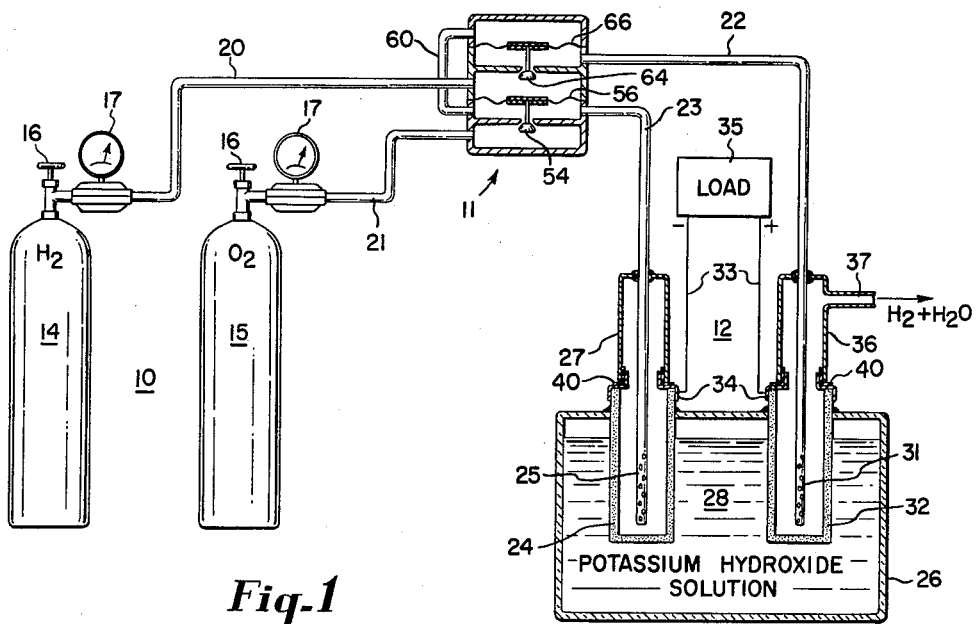

Oct. 8, 1963     J. O. THORSHEIM     3,106,494

DIFFERENTIAL PRESSURE REGULATOR CONTROL SYSTEM

Filed July 20, 1960     3 Sheets-Sheet 3

INVENTOR.
JOSEPH O. THORSHEIM
BY
*Alfred N. Feldman*
ATTORNEY though the fuel system of a hydrogen-oxygen type is described in detail, it is clear that the concepts and apparatus of the present invention are readily applicable to any type of fuel cell or battery using two fluid or gaseous fuels.

United States Patent Office 3,106,494
Patented Oct. 8, 1963

3,106,494
DIFFERENTIAL PRESSURE REGULATOR CONTROL SYSTEM
Joseph O. Thorsheim, Minneapolis, Minn., assignor to Minneapolis-Honeywell Regulator Company, Minneapolis, Minn., a corporation of Delaware
Filed July 20, 1960, Ser. No. 44,136
12 Claims. (Cl. 136—86)

The present invention is directed to a control system for fuel cells that utilize two fluid fuels. More specifically, the present invention is directed to a pressure differential regulating type valve that simultaneously controls both fluids to a fuel cell, and keeps the fuel pressures to the cell within very close limits of one another.

The conversion of fuels into electricity has for a long period of time been accomplished by burning the fuels and subsequently converting the heat into a source of driving power for an electric generator. Due to the inherent losses of this type of system, the net usable energy from the system is approximately 30 percent of the fuel's total energy. This type of arrangement obviously is highly inefficient and as such, investigations have long been under way into means of converting fuels directly into electrical energy without passing through the stage of heat conversion. For many years the transformation of fuel directly into electrical energy has been theoretically recognized and various types of cells for this type of operation have been tested. Basically, the cells are referred to as fuel cells, a simple battery being one special case of a fuel cell.

One general type of fuel cell is an arrangement wherein two fluids are caused to react to generate an electric current. Probably one of the more common types of fuel cells is a cell wherein hydrogen and oxygen are fed into cavities that form electrodes for the unit. These electrodes normally are of a material such as carbon and allow for the hydrogen and oxygen to pass into their surface, since carbon can be made as a rather porous material. The hydrogen and oxygen then come in contact with an electrolyte, which can be such a material as potassium hydroxide. The reducing agent or fuel loses an electron at the electrolyte-electrode interface. The oxydant gains an electron at the opposite electrode forming an anion. The internal circuit is completed by ionic conduction. For convenience, this reaction will be referred to as a chemical reaction with the electrolytic material. The depleted material from this type of cell is a flow of hydrogen and water vapor from one electrode and excess oxygen from the other electrode.

In the present invention the exact type of fuel cell is not of great importance, but one will be described in some slight detail in order to correlate the material as to the inventive control system. The present invention lies in control of the fuels, in fluid form, to a fuel cell that utilizes two fluids as sources of energy. In order to understand the need for a control system it is pointed out that upon loss of control of the relative pressures of the two fluids being fed to a fuel cell, the efficiency of the fuel cell can drop rather drastically. A fuel cell, when operating properly, can have a practical efficiency as high as 80 percent. As a loss of control occurs, this efficiency can drop substantially. In addition to a loss of efficiency, a fuel cell can be mechanically injured by the application of an unbalance of fuels to the cell. More specifically, it is quite hazardous to the fuel cell if one of the fuels is suddenly interrupted or its pressure lost without being able to immediately shut down the second fuel to the cell.

It is therefore important that any control system which keeps a balance of fuels between the two inputs to a fuel cell also be capable of immediately sensing the loss of one of the fuels and therein cutting off promptly the second fuel to the cell.

A straightforward solution of this problem has been suggested but the solution is rather clumsy and expensive. The straightforward solution would be the use of two pressure sensing elements that convert pressure to electrical signals. The electrical signals would in turn be used to control two electrically driven regulating valves. This arrangement would provide the necessary control of the two relative pressures of the fuels to the fuel cell, and would be capable of shutting off either of the fuels in case of loss of the other fuel. It is apparent, however, that this arrangement involves many pieces of equipment and would be expensive to build. Since fuel cells are expected to be used as a source of driving power in highly competitive equipment, it is necessary to find a control that is cheap, simple, has almost instantaneous response, and which takes very little space.

It is the primary object of the present invention to provide a control system for a fuel cell which utilizes two fluid fuels in the form of gases such as hydrogen and oxygen, and which is exceedingly simple, inexpensive, and rapid in response.

A further object of the present invention is to provide a dual fuel control that automatically turns off the second fuel to a fuel cell in case of loss of pressure of the first fuel.

Yet another object of the present invention is to supply a control system that continuously monitors the pressures of both of the fuels supplied to a fuel cell and holds these pressures within very fixed ratios of one another.

Still a further object of the present invetntion is to provide a fuel cell control system that is dependent upon a differential pressure regulator valve that operates to close off the gas flow of one gas if the second gas supply is exhausted or inadvertently interrupted.

And yet another object of the present invention is to disclose a pressure differential regulating valve of a unique design wherein two fluids are simultaneously controlled by the differential of outlet pressures of the fluids.

Still another object of the present invention is to provide a valve that controls two fluids or gases and will turn off one fluid flow upon interruption of the second fluid flow.

Another object of the present invention is to provide a differential pressure regulating valve which will fail safely, shutting off the supply of both fluids, if a leak develops in a diaphragm.

These and other objects will become apparent when a full consideration is undertaken of the present specification and drawings.

Figure 5:
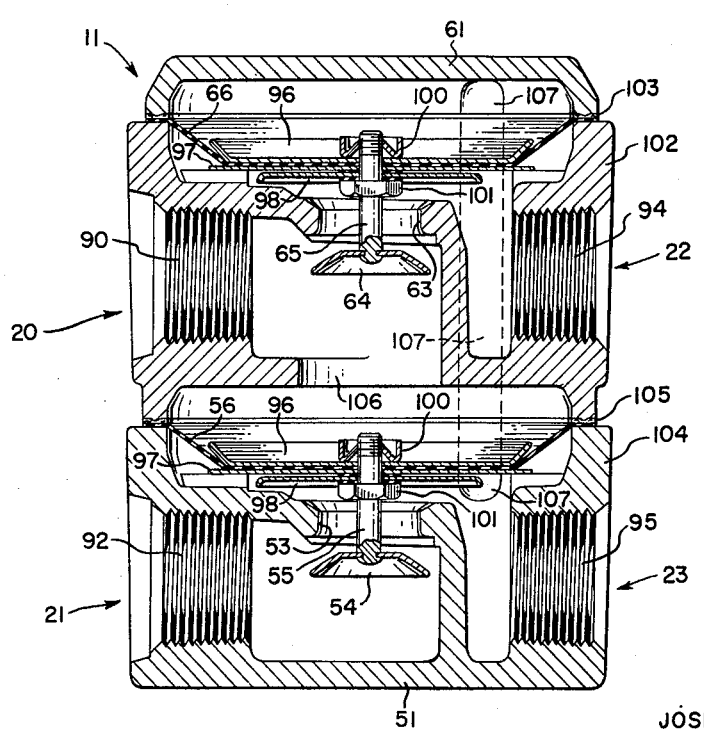
Figure 2:
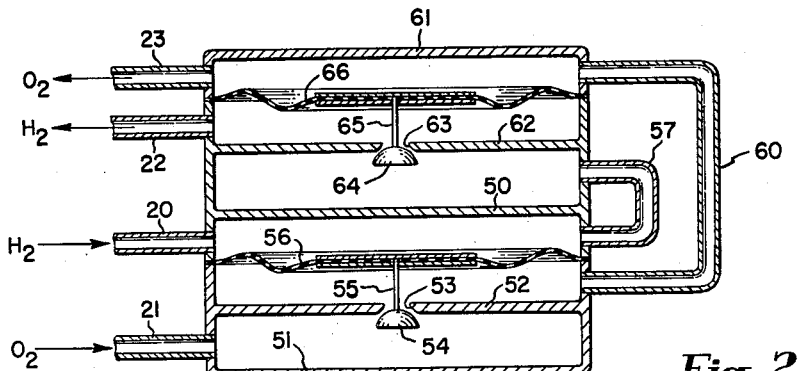
Figure 3:
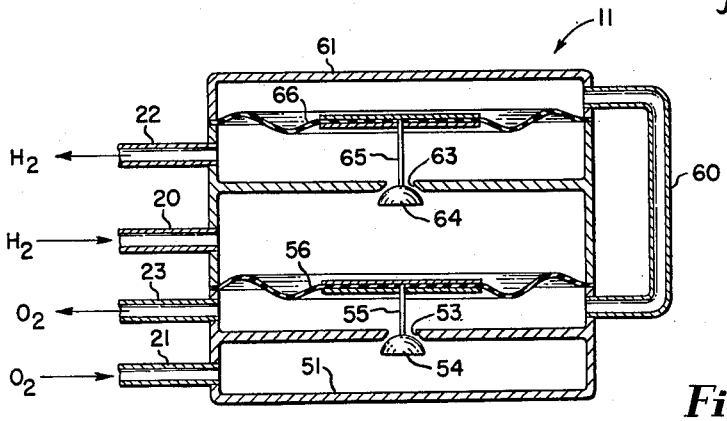
Figure 4:
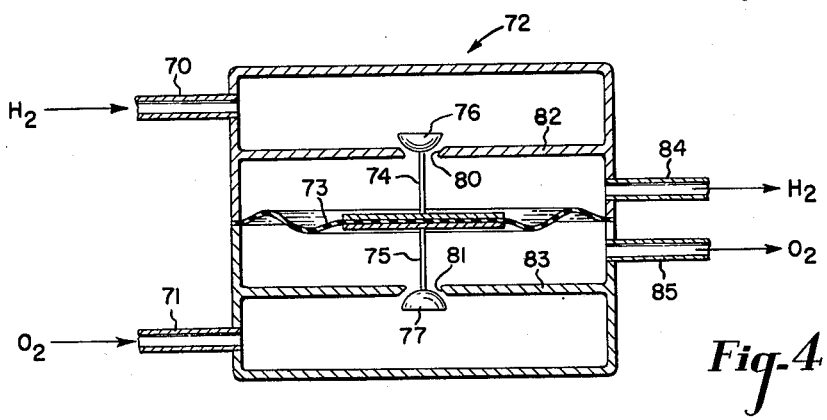
Figure 6:
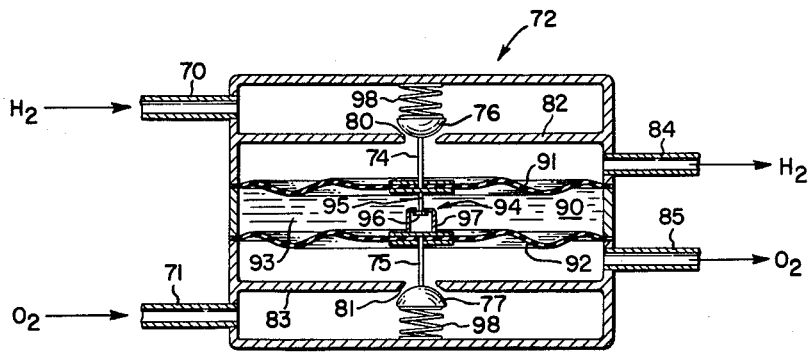
Figure 7:
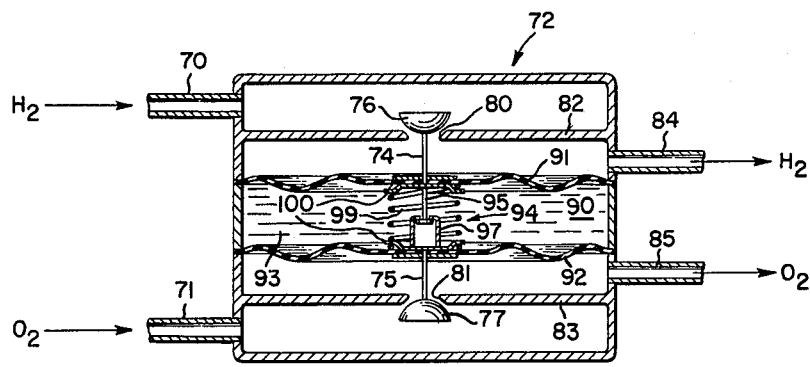

In FIGURE 1 there is disclosed, in schematic form, a hydrogen-oxygen supply system, a fluid control device, and a hydrogen-oxygen fuel cell;

FIGURES 2 through 4 disclose three versions of a control valve in order to more fully explain the principles of operation and various modifications;

FIGURE 5 discloses a cross section of a pressure differential regulating device in a production form, and;

FIGURES 6 and 7 disclose two valves having safety features.

In FIGURE 1 there is generally disclosed a schematic representation of a source of fluid fuels at 10, a control device at 11, and a fuel cell at 12. The fuel source 10 consists of a pressurized bottle of hydrogen 14 and a pressurized bottle of oxygen 15. These pressurized bottles each have a control valve 16 and a pressure regulator 17. By opening the valve 16 a rough regulation of pressure output can be obtained by setting the pressure regulator 17 to a desired level. This places a roughly regulated hydrogen presure in pipe 20 and a similarly regulated pressure of oxygen in pipe 21. The pipes 20 and 21 feed into the control device 11 which functions in a manner that will be described in detail in connection with FIGURES 2 through 4. At this point it is enough to state that the output of the control device 11 is in pipes 22 and 23 to the fuel cell 12. The fluid output of hydrogen and oxygen in pipes 22 and 23 is carefully regulated by the device 11 and upon a failure of either of the hydrogen or oxygen supplies the other supply line is immediately cut off by the device 11. The oxygen from pipe 23 is fed into a carbon electrode 24 through holes 25 in the end of the pipe 23. The oxygen in the electrode 24 diffuses into the walls of the carbon electrode with a potassium hydroxide solution 28 that fills a container 26 into which the electrode 24 is sealed. The excess oxygen passes from the electrode 24 to an upper chamber 27.

The hydrogen supplied through pipe 22 is fed through holes 31 into a chamber formed by electrode 32. The electrode 32 is identical to that of 24 and allows the hydrogen to diffuse into its surface with the potassium hydroxide solution 28. Here the hydrogen unites with hydroxyl ions which have migrated through the electrolyte from the electrode 24 and releases an electron. The electron is the work performing product of the fuel cell and flows in an external electric circuit. This circuit is disclosed as wires 33 connected to the top of the electrodes at 34 and going to an electrical load 35. The excess hydrogen and a byproduct in the form of water pass into the upper chamber 36 that is attached to the top of electrode 32 and pass out of pipe 37 to the atmosphere. The hydrogen and excess water that flow out of pipe 37 could be recirculated in appropriate equipment. The electrodes 24 and 32 are electrically insulated by insulating members 40 to keep the upper chambers 27 and 36 separate, from an electrical standpoint, from the electrodes 24 and 32.

It is understood that the pressure of hydrogen and oxygen in pipes 22 and 23 must be kept closely regulated and must be maintained within a very slight differential of one another. It is also understood that upon loss of the pressure to pipes 20 or 21, both fuels must be cut off from the fuel cell in order to avoid damage to the unit. The presently disclosed control device 11 provides both of these functions in a very simple manner.

FIGURE 2 discloses a control device similar to the device disclosed at 11, but FIGURE 2 is in a slightly different form in order to disclose a principle of operation. After going through the principle of operation by referring to FIGURE 2, the exact details of the device 11, as shown in larger schematic, will be covered in connection with FIGURE 3. The same reference numerals have been used where the related part has the same function as in FIGURE 1. In FIGURE 2, hydrogen is fed into pipe 20 while oxygen is fed into pipe 21. The pipes 20 and 21 pass into a pressure regulating valve body formed of upper and lower walls 50 and 51. The valve is separated by a wall 52 that has a valve seat 53 and a valve member 54. The valve member 54 is connected by means of valve stem 55 to a diaphragm 56 that separates the valve body between the upper and lower walls 50 and 51.

It is apparent that the hydrogen pressure coming in pipe 20 is applied to the top of diaphragm 56 while the oxygen coming in pipe 21 is applied to the bottom of diaphragm 56 through the valve seat 53. As long as the difference in pressure between the hydrogen and oxygen is within the range of operation of the pressure regulator, the diaphragm 56 is positioned to hold the valve member 54 from the valve seat 53. This allows a flow of oxygen past the valve seat 53 into the area beneath the diaphragm 56. At this point, it can be pointed out that if the supply of hydrogen should suddenly be stopped, the pressure of oxygen on the bottom side of the diaphragm 56 through the valve seat 53 would cause the diaphragm 56 to move upward thereby closing the valve member 54 against the valve seat 53. It will thus be seen that upon loss of the hydrogen supply, the oxygen supply is cut off to the underside of the diaphragm 56.

The output of the valve section just described is by means of tubes 57 and 60. The tube 57 carries the hydrogen from the area above the diaphragm 56 out to a second unit in the same manner that the pipe 60 carries the oxygen that has passed through the valve seat 53 to the upper unit. The upper unit has a wall 61 that encloses it in combination with the wall 50. A partition 62 divides this valve into two sections and has a valve seat 63 and a valve member 64 that are connected to a valve stem 65 that is in turn connected to a diaphragm 66. In construction the upper unit is identical to the lower unit but has a common wall 50 with the lower unit. The hydrogen passing through the lower unit from pipe 20 through pipe 57 is fed into the lower area beneath the diaphragm 66. The oxygen that has passed through the valve seat 53 into pipe 60 is fed to the upper side of the diaphragm 66. It is thus again apparent that the hydrogen and oxygen pressures are applied across the diaphragm 66 to cause it to regulate the flow of the hydrogen passing from pipe 20 through pipe 57 into the upper unit. The gas flow is regulated across the valve 64 and valve seat 63 in a conventional fashion. The output of the hydrogen passes to pipe 22 while the output of oxygen passes to pipe 23. In this discussion it can be seen that the output pressures will be the same (or at a constant difference) at all times regardless of input pressures and will be controlled by the pressure of the lower pressure inlet gas.

If the arrangement shown in FIGURE 2 loses the oxygen pressure, the hydrogen in pipe 20 forces the valve 54 to its full open position but continues to allow hydrogen to flow to pipe 57 and the upper valve 64. With the loss of oxygen to the unit, there is no pressure in pipe 60 and therefore there is no pressure on the upper side of diaphragm 66. The pressure of hydrogen on the bottom of diaphragm 66 forces the diaphragm up, closing the valve 64 against the valve seat 63 thereby cutting off the hydrogen supply. In this discussion it can be seen that upon loss of the hydrogen or oxygen to the control device disclosed in FIGURE 2, one or the other of the diaphragms 56 or 66 moves to immediately close the appropriate valve, cutting off the supply of the second fuel.

In FIGURE 3, there is disclosed a slightly simplified version of the device in FIGURE 2. The device disclosed in FIGURE 3 is identical to device 11 as disclosed in FIGURE 1 except for the location of pipes 20 and 21. Hydrogen and oxygen are fed once again into pipes 20 and 21, respectively. The oxygen coming in pipe 21 passes through the valve seat 53 and to the underside of diaphragm 56. The oxygen is then fed out of tube 23. The oxygen supply is applied to the bottom of diaphragm 56 and is also supplied to tube 60. Tube 60 then supplies oxygen pressure to the underside of wall 61 and the upper side of the diaphragm 66. With this arrangement the oxygen is controlled through the valve 54 and valve seat 53 but also applies pressure to the top of the diaphragm 66.

The hydrogen pressure is applied to pipe 20, which directly communicates with the top of diaphragm 56, as well as with valve 64 and valve seat 63. This allows the hydrogen to be applied to the underside of the diaphragm 66 as well as being directly applied to the top of diaphragm 56. The hydrogen is allowed to flow out of pipe 22. It will be noted that the only difference between FIGURES 2 and 3 is the simplification in FIGURE 3 by removal of the partition 50 of FIGURE 2 within the unit and the connecting pipe 57. A careful consideration of FIGURE 2 will disclose that the chambers that are formed by the separating wall 50 are directly intercommunicated with another through pipe 57. The removal of the wall 50 does nothing more than eliminate the need for pipe 57 and simplify the design.

The operation of the unit is still the same as that described in connection with FIGURE 2. The oxygen is allowed to come into pipe 21 through the valve 54 and back out through pipe 23. The oxygen is continuously supplying a pressure to the underside of diaphragm 56 and to the upper side of diaphragm 66. The hydrogen is passed into the pipe 20 and applies a pressure directly to the top of diaphragm 56 while passing through the valve 64 to the underside of diaphragm 66. The hydrogen is then allowed to flow out of pipe 22. In this arrangement, each of the fluid pressures is applied to the top and bottom of each of the diaphragms. This allows for immediate operation of one of the diaphragm members to a close-off position upon loss of pressure of the other fluid. It will thus be appreciated that by providing a double diaphragmed valve having two input fuels, wherein the fuels are allowed to be applied to opposite sides of each of the diaphragms, it is possible to provide a pressure differential regulating valve that is capable of closing itself upon loss of either one of the fuels. This arrangement is essential in the operation of the disclosed fuel cell.

In FIGURE 4, there is a highly simplified arrangement of a valve in an improved form. The improved valve of FIGURE 4 has a hydrogen inlet 70 and an oxygen inlet 71. Both of the inlets 70 and 71 are fed into a valve body generally shown at 72. The valve body is separated into two valves by diaphragm 73. The diaphragm 73 supports two oppositely extending control members 74 and 75. Each of the control members has a valve 76 and 77 which cooperates with valve seats 80 and 81 which are formed into partitions 82 and 83. The valve body 72 has outlets 84 for the hydrogen and 85 for the oxygen.

In the schematic representation of FIGURE 4 it will be appreciated that the hydrogen passing into pipe 70 applies a pressure to the top of the diaphragm 73, while the oxygen coming into pipe 71 applies a pressure to the bottom of diaphragm 73. This difference in pressure, when properly supplied, keeps the diaphragm centrally located in the valve body 72. This keeps the valves 76 and 77 appropriately spaced from their valve seats 80 and 81. If one or the other of the pressures increases, the pressure differential across the diaphragm 73 increases, thereby moving both valves 76 and 77 to regulate the output at pipes 84 and 85. This pressure differential regulating valve thereby supplies the necessary pressure differential and flow from the hydrogen-oxygen supplies at 70 and 71 to the output pipes 84 and 85. It will also be noted that if either the hydrogen or oxygen supplies to pipes 70 and 71 is lost, the full pressure of the other fuel is applied to the appropriate side of the diaphragm. Since the full pressure is applied, the valve associated with the pressurized side immediately closes, thereby cutting off the flow of fuel to the fuel cell. The valve disclosed in FIGURE 4, therefore, is a highly simplified arrangement that provides the novel arrangement wherein pressure differential regulation is obtained by keeping pressures of two fuels each on the opposite sides of a diaphragm means to supply the regulation and control needed.

In FIGURE 5 there is disclosed a production version of a pressure differential regulating valve identical in function to the valve 11. FIGURE 5 has been laid out so as to correspond exactly with the layout disclosed in the valve 11 of FIGURE 1. The valve 11 has an inlet 20 that is threaded at 90 in order to provide convenient connection in a conventional manner. Inlet 21 is threaded at 92 to provide connection to the oxygen supply of the device. The hydrogen outlet 22 is threaded at 94 and the oxygen outlet 23 is threaded at 95. This provides the four inlet and outlet openings that correspond to the device disclosed in FIGURE 1.

The hydrogen inlet 20 leads to the valve 64 which is connected to valve stem 65. The valve stem passes through the valve seat 63 to the underside of diaphragm 66. The valve stem 65 is attached to diaphragm 66 by means of plates 96, 97, and 98. These plates are held in an assembled relationship by nuts 100 and 101. The arrangement of clamping of the valve stem 65 to the diaphragm 66 is conventional and is not believed to warrant detailed description.

The upper wall 61 of the valve 11 is held onto the valve body 102 at a gasket 103 by any convenient means (not shown). The wall 61 and the diaphragm 66 provide the upper chamber of the differential pressure regulator. The underside of the diaphragm 66 along with the valve 64 and the valve seat 63 provide the control of the hydrogen coming into inlet 20 and passing through to outlet 22. The valve 63, which forms part of the valve body 102, is of conventional design and is attached to the top of a second part of the valve body 104 at gasket 105 by any convenient means (not shown). It will be noted that the bottom of the valve 102 is open at 106 to allow free communication of the hydrogen to the upper side of diaphragm 56. The diaphragm is clamped between plates 96, 97, and 98 by means of nuts 100 and 101 in a fashion similar to the upper diaphragm arrangement. The valve stem 55 provides the support for valve 54 through valve seat 53. The valve seat separates the oxygen inlet 21 from the oxygen outlet 23. A slot 107 is provided in the valve body to provide a communication between the chamber above diaphragm 66 to the chamber below diaphragm 56. The slot 107 is identical in function to pipe 60 of FIGURES 1 and 3.

In considering the operation of FIGURE 5, it is identical to that of FIGURE 3 but will be briefly described so that the fluid flow passages will be readily apparent. The hydrogen is fed into the threaded section 90 to the valve 64 and also through opening 106 to the top of diaphragm 56. The hydrogen is supplied to the underside of diaphragm 66 through the valve 63 as well as being supplied to the outlet 22. The oxygen inlet at 21 supplies oxygen to the underside of diaphragm 56 and to the slot 107 through the valve seat 53. The slot 107 provides an opening to supply oxygen to the top of diaphragm 66 as well as to the outlet 23. It will thus be appreciated that all of the details disclosed in FIGURE 3 are present in FIGURE 5 and its operation is the same. FIGURE 5 has been disclosed to show a production version of the device, which is one of the preferred embodiments of the present invention.

In FIGURES 6 and 7 there are disclosed two versions of a valve following the form of the valve disclosed in FIGURE 4. The device in FIGURE 4 utilizes a diaphragm means that separates the hydrogen and oxygen sections and moves the valves 76 and 77. In the case of the devices in FIGURES 6 and 7, the construction is substantially identical to that of FIGURE 4 except for the substitution of a safety diaphragm means for the single diaphragm 73. The safety diaphragm means and its operation will be described in detail, but the balance of the valve structure will be mentioned only incidentally in order to avoid repetition.

The device in FIGURE 6 has inlets 70 and 71 along with outlets 84 and 85 which are controlled by valves 76 and 77 in cooperation with the valve seats 80 and 81. The diaphragm 73 of FIGURE 4 has been replaced by a fluid filled diaphragm means generally shown at 90. This diaphragm means includes two substantially parallel diaphragms 91 and 92 with a fluid 93 under pressure between the diaphragms. The fluid 93 can be of any convenient form such as a gas or a liquid, but in the preferred embodiment the fluid is shown as a liquid. The fluid 93 is placed between diaphragms 91 and 92 under pressure and would tend to force the diaphragms apart except for the limit or stop means generally shown at 94. The limit means 94 includes a stem 95 that extends from the control member 74 and has an enlarged end 96. The enlarged end 96 is held by a clamplike member 97 which is connected to the control member 75. The limit means 74 keeps the diaphragms 91 and 92 separated a maximum fixed distance under the influence of the pressurized fluid fill 93.

Two identical springs 98 are placed between the valves 76 and 77 and the outside walls of the valve body 72. The springs 98 exert equal and opposite pressure on the pair of valves 76 and 77 but are not of sufficient strength to compress the fluid 93 contained between the diaphragms 91 and 92.

In operation, if at any time either of the diaphragms 91 or 92 should spring a leak, the fluid 93 is allowed to flow out into the valve body. The fluid 93 is selected so as to be compatible with the fuels being used in the fuel cell associated with the control device. As the fluid 93 leaks out, the springs 98 compress against the valves 76 and 77 allowing the valves to move to their valve seats 80 and 81. This is in turn allowed by the limit means 94 since the member 95 rides into the clamplike member 97 thereby permitting the springs 98 to completely close the valves 76 and 77 against their respective seats. The springs 98 are selected to have sufficient force to overcome the fluid pressures of the hydrogen and oxygen but are of insufficient strength to compress the fluid 93.

It can thus be seen that a valve having the unique pressure differential regulating properties of the previous embodiments has been disclosed, but also incorporates a safety feature that closes off both the hydrogen and oxygen supplies in case of a leak in the diaphragm means.

In FIGURE 7 a similar valve arrangement is shown and the double diaphragm 91 and 92 is again disclosed. In this application the limit means is again provided at 94 and has stem 95 and clamplike member 97. In this embodiment the two springs 98 of FIGURE 6 are replaced by a single spring 99 of a compression type. The spring 99 is attached by plates 100 to the control members 74 and 75. The spring 99 pulls on the plates 100 but the fluid 93 contained between the diaphragms 91 and 92 keeps the diaphragms in a substantially parallel position.

It is again obvious that if a leak develops in either one of the diaphragms 91 or 92, the fluid 93 leaks out into the valve body 72. Upon leaking out into the valve body, the restraining force between the diaphragms is removed and the spring 99 is allowed to compress, thereby closing valves 76 and 77 against their respective valve seats 80 and 81.

With valves of the type disclosed in FIGURES 6 or 7, continuous pressure differential regulation is accomplished between the pressure sources and the fuel cell. In addition the device automatically will close if either of the fuels to the fuel cell is lost, as will the valves disclosed in FIGURES 2 to 5. In addition to the automatic closure in case of loss of one or the other of the fuels, the valves in FIGURES 6 and 7 will automatically close if either of the valves develops a diaphragm leak. With the arrangements disclosed in FIGURES 6 and 7 a complete control device is provided for fuel cells that is safe, cheap, simple in construction, and has almost instantaneous response. The unit also takes far less space than more conventional pressure control devices that would be capable of doing the same job as the presently disclosed invention.

The pressure control system for a fuel cell wherein two fluids chemically react within an electrolytic material to liberate electrical energy that can flow in an external electric circuit has been described in detail in connection with two basically different types of valve constructions. The first valve construction utilizes two separate and distinct diaphragms for control of the two fluid flow passages, wherein the second embodiment of valve discloses a single diaphragm means that is capable of performing both functions of the dual diaphragm of the first version. It becomes obvious that many modifications are possible, both in the fluid control system and the associated pressure regulating valves, and therefore the present invention is limited only by the scope of the appended claims and not to the specific embodiments disclosed.

I claim as my invention:

1. A pressure control system, comprising: a fuel cell wherein two fluids chemically react with an electrolytic material to liberate electrical energy which can flow through an external electric circuit; supply means including two fluid fuels supplied for consumption in said fuel cell; differential pressure control valve means connected to said supply means and having separate controllable passages to allow said fuels to pass through said valve means; said controllable passages each being operated in response to a position of diaphragm means.

2. A pressure control system, comprising: a fuel cell wherein two gases chemically react with an electrolytic material to liberate electrical energy which can flow through an external electric circuit; supply means including two gas fuels supplied for consumption in said fuel cell; differential gas pressure control valve means connected to said supply means and having separate controllable passages to allow said gases to pass through said valve means; said controllable passages each being operated in response to a position of diaphragm means; and each of said gas fuels applying a pressure to said diaphragm means to position said diaphragm means to allow both gases to flow to said fuel cell at a pressure determined by the lower pressure of said gases; said diaphragm means moving to close said valve means upon loss of either of said fuels.

3. A pressure control system for a fuel cell wherein two fluids chemically react with an electrolytic material to liberate electrical energy which can flow through an external electric circuit comprising: a fuel cell and supply means including two fluid fuels supplied for consumption in said fuel cell; differential pressure control valve means connected to said supply means and having separate controllable passages to allow said fuels to pass through said valve means; said controllable passages each being operated in response to a position of a diaphragm; and each of said fluid fuels applying a pressure to opposite sides of said diaphragm to position said diaphragm to allow both fuels to flow to said fuel cell at a pressure determined by the lower pressure of said fuels.

4. A pressure control system for a fuel cell wherein two gases chemically react with an electrolytic material to liberate electrical energy which can flow through an external electric circuit comprising: a fuel cell and supply means including two gas fuels supplied for consumption in said fuel cell; a differential pressure control valve connected to said supply means and having separate controllable passages to allow said gases to pass through said valve; said controllable passages each being operated in response to a position of a diaphragm; and each of said gases applying a pressure to opposite sides of said diaphragm to position said diaphragm to allow both gases to flow to said fuel cell at a pressure determined by the lower pressure of said gases; said diaphragm moving to close one passage upon loss of gas pressure to the other said passage.

5. A pressure control system for a fuel cell wherein two fluids chemically react with an electrolytic material to liberate electrical energy which can flow through an external electric circuit comprising: a fuel cell and supply means including two fluid fuels supplied for consumption in said fuel cell; differential pressure control valve means connected between said supply means and said fuel cell; said valve means including two diaphragms sealing two flow passages; each said diaphragm being connected to a control member for controlling fluid flow through said passages; and passage means interconnecting said flow passages to apply each said fluid to opposite sides of each said diaphragm thereby moving said diaphragms in response to the difference in pressures of said fluids; said movement in turn moving said control members to maintain a constant differential pressure output from said valve means.

6. A pressure control system for a fuel cell wherein two gases chemically react with an electrolytic material to liberate electrical energy which can flow through an external electric circuit comprising: a fuel cell and supply means including two gas fuels supplied for consumption in said fuel cell; a differential pressure control valve connected between said supply means and said fuel cell; said valve including two diaphragms sealing two flow passages; each said diaphragm being connected to a control member for controlling gas flow through said passages; and passage means interconnecting said flow passages to apply each of said gases to opposite sides of each said diaphragm thereby moving said diaphragms in response to the difference in pressures of said fluids; said movement in turn moving said control members to maintain a constant differential pressure output from said valve and further closing said valve in the event of loss of pressure of either of said gases.

7. A pressure control system, comprising: a fuel cell wherein two fuels chemically react with an electrolytic material to liberate electrical energy which can flow through an external electric circuit; supply means including two fluid fuels supplied for consumption in said fuel cell; differential pressure control valve means connected to said supply means and having separate controllable passages to allow said fuels to pass through said valve means; said controllable passages each being operated in response to a position of diaphragm means; said diaphragm means including two diaphragms containing a fluid and held in substantially parallel relationship by limit means; resilient means applying a continuous force to said diaphragms tending to move said diaphragms together; and each of fluid fuels applying a pressure to opposite sides of said diaphragm means to position said diaphragm means to allow both fuels to flow to said fuel cell at a pressure determined by the lower pressure of said fuels; both said fuels being shut off by closure of said passages if either of said diaphragms leak thereby allowing said resilient means to compress said diaphragm means.

8. A pressure control system, comprising: a fuel cell wherein two fuels chemically react with an electrolytic material to liberate electrical energy which can flow through an external electric circuit; supply means including two gas fuels supplied for consumption in said fuel cell; a differential pressure control valve connected to said supply means and having separate controllable passages to allow said fuels to pass through said valve; said controllable passages each being operated in response to a position of diaphragm means; said diaphragm means including two diaphragms containing a liquid and held in substantially parallel relationship by slideable stop means; spring means applying a continuous force to said diaphragms tending to move said diaphragms together; and each of said gases applying a pressure to opposite sides of said diaphragm means to position said diaphragm means to allow both gases to flow to said fuel cell at a pressure determined by the lower pressure of said gases; both said gases being shut off by closure of said passages if either of said diaphragms leak thereby allowing said spring means to compress said diaphragm means; said diaphragm means further moving to close one passage upon loss of gas pressure to the other said passage.

9. A differential pressure safety control device comprising: a valve body having two separate passages connected to separate inlets and separate outlets within said body; said passages each having diaphragm means sealing said passages with said diaphragm means being connected to control members having safe positions for controlling flow through said valve body; each said inlet connected to opposite sides of said diaphragm means through said control members thereby moving said diaphragm means in response to any difference in pressure applied to said inlets; said diaphragm means including two diaphragms containing a fluid of fixed volume and held in substantially parallel relationship by limit means; and resilient means applying a continuous force to said diaphragms tending to move said diaphragms together; both said passages being closed by said control members moving to said safe positions if either of said diaphragms leaks by allowing said resilient means to compress said diaphragm means.

10. A differential pressure safety control valve comprising: a valve body having two separate passages connected to separate inlets and separate outlets within said body; said passages each having diaphragm means sealing said passages with said diaphragm means being connected to control members having safe positions for controlling flow through said valve body; each said inlet connected to opposite sides of said diaphragm means through said control members thereby moving said diaphragm means in response to any difference in pressure applied to said inlets; said diaphragm means including two diaphragms containing a liquid of fixed volume and held in substantially parallel relationship by slideable stop means; and spring means applying a continuous force to said diaphragms tending to move said diaphragms together; both said passages being closed by said control members moving to said safe positions if either of said diaphragms leaks by allowing said resilient means to compress said diaphragm means; said diaphragm means moving in response to any difference in pressures applied to said inlets to maintain a constant differential pressure output from said outlets and further closing said valve in the event of loss of pressure to either of said inlets.

11. A differential pressure safety control device comprising: a valve body having two separate internal flow passages; each said flow passage including an inlet and an outlet being separated by a valve member having a safe position for controlling flow through each said passage; said passages each being sealed by diaphragm means and having connection means attached to said valve member to vary the flow through each said passages depending upon the position of said diaphragm means; said diaphragm means including two diaphragms containing a fluid of fixed volume and held in substantially parallel relationship by limit means; and resilient means applying a continuous force to said diaphragms tending to move said diaphragms together; both passages being closed off by said valve members moving to said safe positions if either of said diaphragms leak by allowing said resilient means to compress said diaphragm means.

12. A differential pressure safety control device comprising: a valve body having two separate internal flow passages; each said flow passage including an inlet and an outlet being separated by a valve member having a safe position for controlling flow through each said passage; said passages each being sealed by diaphragm means and having connection means attached to said valve member to vary the flow through each said passages depending upon the position of said diaphragm means; said diaphragm means including two diaphragms containing a liquid of fixed volume and held in substantially parallel relationship by slideable stop means; and spring means applying a continuous force to said diaphragms tending to move said diaphragms together; said diaphragm means moving in response to any difference in pressures applied to said inlets; said movement in turn moving said valve members to maintain a constant differential pressure output from said outlets and further closing said device in the event of loss of pressure to either of said outlets; both passages being closed off by said valve members moving to said safe positions if either of said diaphragms leaks by allowing said resilient means to compress said diaphragm means.

References Cited in the file of this patent

UNITED STATES PATENTS

| | | |
|---|---|---|
| 1,182,759 | Emanuel | May 9, 1916 |
| 1,213,159 | Dalen | Jan. 23, 1917 |
| 1,359,881 | Emanuel | Nov. 23, 1920 |
| 1,798,317 | Eaton | Mar. 31, 1931 |
| 2,145,114 | Gibbs et al. | Jan. 24, 1939 |
| 2,414,842 | Trexler | Jan. 28, 1947 |
| 3,002,039 | Bacon | Sept. 26, 1961 |